INVENTOR.
BY Roy K. Andres
Charles H. Brown
ATTORNEY

AUTOMATIC SWITCHING CIRCUIT

Filed Feb. 24, 1955 2 Sheets-Sheet 2

Fig. 2.

| TERMINAL NO. | EXTERNAL CONNECTIONS TO TERMINALS |
|---|---|
| 1 | CONTROL PULSE OR STEADY BATTERY (MUX OR SOLO) |
| 2 | TO CLUTCH OF NUMBERING (N) TRANSMITTER |
| 3 | TO AUTOMATIC STOP CONTACTS OF "N" TRANSMITTER |
| 4 | TO CLUTCH OF "A" MESSAGE TRANSMITTER |
| 5 | TO CLUTCH OF "B" MESSAGE TRANSMITTER |
| 6 | TO AUTOMATIC STOP CONTACTS OF "A" TRANSMITTER |
| 7 | TO AUTOMATIC STOP CONTACTS OF "B" TRANSMITTER |
| 8<br>9 | TO NORMALLY OPEN PUSH BUTTON FOR NUMBER SUPPRESS |

Fig. 3.

| RELAY | TYPE (SEE FIG. 4) | CONTACTS USED |
|---|---|---|
| FA | U | TRANSFER (8-9-10): NORMALLY OPEN (6-7; 1-2) |
| FB | U | TRANSFER (8-9-10): NORMALLY OPEN (6-7; 1-2) |
| A | U | TRANSFER (8-9-10) |
| B | Y | TRANSFER (1-2-3): NORMALLY CLOSED (8-9) |
| C | U | TRANSFER (3-4-5; 8-9-10): NORMALLY OPEN (1-2; 6-7) |
| D | U | TRANSFER (3-4-5; 8-9-10): NORMALLY OPEN (1-2; 6-7) |
| E | U | TRANSFER (8-9-10): NORMALLY OPEN (1-2; 6-7) |

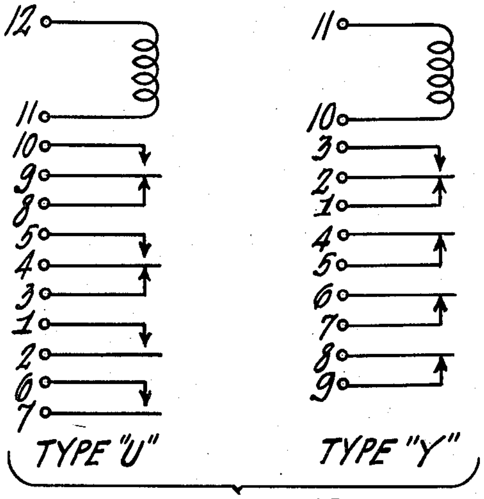

Fig. 4.

INVENTOR.
Roy K. Andres
BY Charles H. Brown
ATTORNEY

United States Patent Office 2,899,497
Patented Aug. 11, 1959

2,899,497

AUTOMATIC SWITCHING CIRCUIT

Roy K. Andres, Glen Cove, N.Y., assignor to Radio Corporation of America, a corporation of Delaware Application February 24, 1955, Serial No. 490,175

6 Claims. (Cl. 178—17)

This invention relates to automatic switching circuits and, particularly, to an automatic switching circuit for multiple telegraph transmitter control.

Telegraph transmitting equipment, using any one of the common multi-element coded forms of transmission, particularly, remotely controlled equipment, is in many applications operated in response to a control signal which energizes or deenergizes an electromagnetic clutch mechanism. Automatic switching circuits have been devised, which are responsive to such a control signal, to act as a director for switching such a control signal among a plurality of telegraph transmitters. The control signal may be a continuous potential signal when the transmitters are operating solo or in single signal condition. In recent years, however, the multiplex operation of telegraph transmitters has found wide acceptance, much of telegraph communication now being carried out in this form of transmission. In addition, synchronous multiplex operation readily lends itself to error detection and automatic error correction systems of the return channel re-cycling type.

Automatic switching circuits have been constructed which are suitable for use with the continuous potential type of transmitter control signal. This type of control signal, however, cannot be used with the multiplex type of operation, because it is necessary to supply the control signal in a pulse form to synchronously operate a multiplex transmitter arrangement. A switching circuit suitable for use with a continuous potential controlled transmitter is not suitable for use with a pulse controlled multiplex transmitter due to the fact that in multiplex operation it is essential that the switching circuit act as both director and synchronizer of the control pulse to insure the synchronized operation of the telegraph transmitter. It has, therefore, been necessary to maintain different automatic switching circuits for both types of transmission, namely, multiplex and non-multiplex transmitter operation. Attempts to devise switching circuits suitable for use with both types of operation have resulted in complicated circuitry and arrangements including an excessive number of components and a manual operation to switch from one type of operation to the other.

For reasons of economy and ease of operation, it is necessary that a transmitting station be equipped with an automatic switching circuit which will be responsive to both types of control signals. Such an automatic switching circuit should be able to control the operation of a multiple number of transmitters in response to either a continuous type of control signal or a pulse or multiplex type of control signal.

It is an object of the invention to obtain an improved automatic switching circuit for multiple telegraph transmitter control.

It is a further object of the invention to obtain a novel form of automatic switching circuit responsive to either a continuous potential control signal or pulse type of control signal for multiple telegraph transmitter control.

It is a still further object of the invention to obtain an automatic switching circuit which may interchangeably be utilized to control the operation of a multiple number of multiplex operated telegraph transmitters or a multiple number of non-multiplex operated telegraph transmitters.

It is a still further object of the invention to obtain an automatic switching circuit for multiple telegraph transmitter control which is simple and compact in construction.

The objects of the invention are accomplished by a switching circuit including a number of multiple contact relays. The contacts and windings of the relays are interconnected in such a manner that, when a particular telegraph transmitter is selected for operation, the relays are activated and deactivated in a predetermined sequence to connect a control signal to successive individual transmitters of a group, in a predetermined sequence. The sequence of operation is, in turn, controlled by one of the relays which is responsive to a control signal.

When the transmitters are operating solo or in a single signal condition (as distinguished from multiplex operation), the circuit will operate much as any other switching circuit, acting as an on-off control for distributing the control signal to a number of transmitters. However, when the circuit is to be used with a number of transmitters which are to be used in multiplex operation, certain allowances must be made in the circuit. The switching circuit, in order to satisfactorily control the operation of a group of transmitters in synchronism with the multiplexing equipment, must insure that the control signal pulse is synchronously switched as a complete pulse to the individual transmitters of the group and in accordance with the predetermined sequence. The control signal from the multiplexing equipment is in the form of pulses of suitable amplitude and duration to control the transmitter. If the switching circuit should switch the control pulse line to any one of the multiple transmitters without being synchronized with the arrival of the control pulse from the multiplexing equipment, the first characters of a message transmitted from the multiplexing equipment will be mutilated and considerable difficulty will be experienced in communicating a clear and correct message to a distant point.

To achieve the interchangeable nature of the switching circuit, that is, one that is capable of use with either a multiplex or non-multiplex form of transmission, the relay which controls the synchronizing function and thus the sequential timing of the circuit is in one embodiment a slow operate-slow release type. Such a relay serves to properly control transmitters which may be multiplex or non-multiplex in operation, and does not deleteriously affect the operation of the circuit if a continuous or steady battery control signal for non-multiplex operation is utilized. On the other hand, the circuit automatically eliminates the random timing between the initiation of the message and the arrival of the control pulse from the multiplexing equipment when the transmitters are being operated in a relaxation control manner from an electronic or mechanical multiplex. The relay circuit insures that only complete control pulses will be passed to the clutch magnet of a message transmitter by counting the first complete control pulse or fraction thereof and utilizing this first control pulse to complete the balance of the switching functions, thereby, avoiding the mutilation of the first characters of a message as would occur if the switching circuit were not in synchronism with the transmitting multiplex equipment.

Typical telegraph transmitting stations include an auxiliary transmitter which is automatically used to transmit a message before the regular message transmitter is permitted to proceed. Such an auxiliary transmitter may transmit routing information and/or one of a sequential group of numbers, thereby, directing the message to a particular destination and/or numerically identifying the subsequent message. Such an auxiliary transmitter, as in the case of the regular message transmitter, must be controlled so that proper operation will result when either multiplex or non-multiplex operation is used. The automatic switching circuit of the invention includes the automatic control of such an auxiliary transmitter and insures its proper operation regardless of the type of operation utilized.

A more detailed description of the invention follows with reference to the accompanying drawing in which:

Figure 1 discloses an automatic switching circuit, constructed in accordance with the invention, for controlling the operation of a pair of message telegraph transmitters and an auxiliary transmitter;

Figure 2 is a chart given in explanation of the connections to the terminals 1 to 9 shown in Figure 1;

Figure 3 is a chart of the make-up of a particular set of relays suitable for use in the circuit shown in Fig. 1 and is given only by way of example; and Figure 4 is a schematic drawing of the particular relays included in Fig. 1 and described in Fig. 3 disclosing the construction of the contacts thereof.

Figure 1:
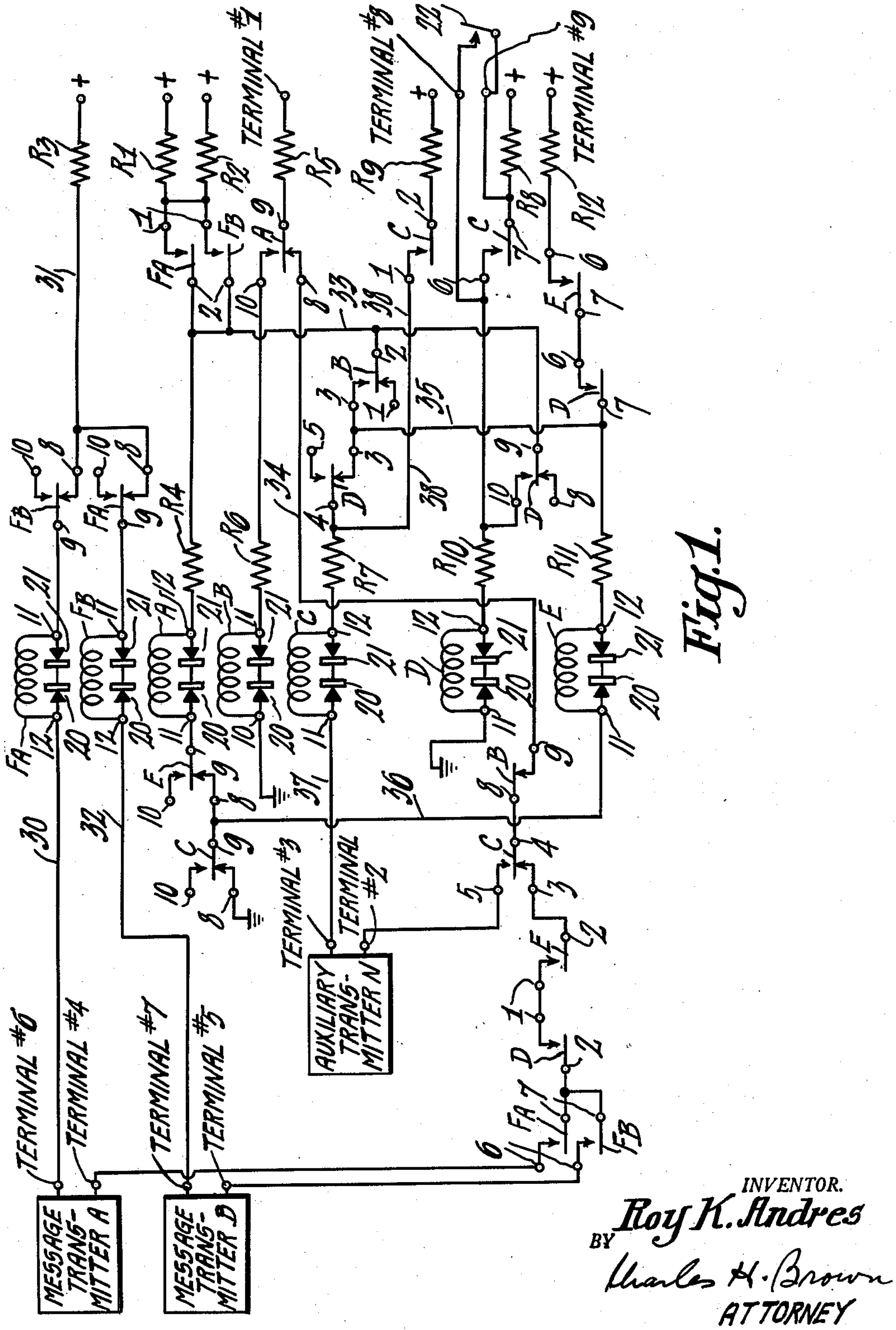

Referring to Figures 1 and 2, there is shown an automatic switching circuit for automatically controlling the operation of a pair of message telegraph transmitters A and B and an auxiliary transmitter N. These transmitters are shown in box form at the left of Fig. 1 and may be any suitable clutch controlled telegraph transmitter type using sensing pins in association with a multi-element punched tape for sending out a multi-element code signal such as a 5-unit signal, for example. The auxiliary transmitter N will, for purposes of description, be referred to as a numbering transmitter, but it is to be understood that the transmitter could be utilized to automatically transmit any form of information desired. The intelligence carrying output circuits of the transmitters A, B and N are connected to utilization circuits, not shown. The outputs of the transmitters may be connected to a common circuit keying multiplexing equipment or directly keying a radio frequency transmitter. The particular circuit to which the outputs of the transmitters are fed will depend upon the method of operation of the communication system within which the transmitter and automatic switching circuit of the invention are to be employed.

When it is desired to transmit a message, one of the telegraph message transmitters A or B is selected for use. It will be assumed, hereafter, that transmitter A has been so selected, but it is to be understood that the operation of the circuit upon the selection of transmitter B will be the same. The message, if on tape, for example, is inserted in transmitter A closing the automatic stop contacts of transmitter A and completing a ground circuit thru terminal 6, lead 30, the winding of relay FA, armature 9 and contact 8 of relay FB, lead 31, and resistor R3 to the positive or plus terminal of a source of potential. Relay FA will then operate. Upon the operation of relay FA, contact 8 and armature 9 of the relay FA will open and open the circuit thru the winding of relay FB, which is connected on one side to transmitter B thru lead 32 and terminal 7, and on the other side to the positive terminal of a source of potential thru the foregoing contacts. The energization of relay FA prevents the operation of transmitter B by the switching circuit while transmitter A is in operation. Stated otherwise, the switching circuit of the invention permits a control signal to be applied either to transmitter A or transmitter B but not to both transmitters at the same time, as will appear hereinafter. Relay FB is locked out by the operation of relay FA.

The operation of relay FA closes a circuit to operate relay A over a path traced from the positive terminal thru resistors R1 and R2, make contact 1 and armature 2 of relay FA, resistor R4 and the winding of relay A to ground thru armature 9 and break contact 8 of relay E and armature 9 and beak contact 8 of relay C. Two shunt-connected resistors R1 and R2 are used in the embodiment shown in Fig. 1 to permit proper power dissipation. However, resistors R1 and R2 may be replaced by a single resistor in a particular application without departing from the spirit of the invention. When relay A operates, a control signal, which may be a multiplex control pulse or a continuous potential signal, as will be more fully discussed later, supplied to terminal 1, passes thru resistor R5, armature 9 and make contact 10 of relay A, resistor R6 and thru the winding of relay B to ground, operating relay B.

When relay B operates, a circuit is closed to operate relay C over a path traced from the positive terminals through resistors R1 and R2, make contact 1 and armature 2 of relay FA, lead 33, armature 2 and make contact 3 of relay B, break contact 3 and armature 4 of relay D, resistor R7 and thru the winding of relay C, operating relay C which completes its ground circuit via lead 37 and terminal 3 and the normally closed letters contacts of the numbering transmitter N. Upon the operation of relay C, break contact 8 will no longer engage armature 9 of relay C, thereby, breaking the ground connection to the winding of relay A and interrupting the operating circuit thereof, releasing relay A. The positive terminal of a source of potential is then connected thru resistor R9, armature 2 and make contact 1 of relay C, lead 38 and resistor R7 to the winding of relay C, causing relay C to self-hold. Upon the operation of relay C, a circuit is closed to operate relay D over a path traced from the positive terminal thru resistor R8, armature 7 and make contact 6 of relay C to ground thru resistor R10 and the winding of relay D.

Relay D will hold itself operated by a circuit traced from the winding of relay D through resistor R10, make contact 10 and armature 9 of relay D, lead 33, armature 2 and make contact 1 of relay FA and resistors R1 and R2 to the positive terminal of a source of potential. At this point, the control signal appearing at terminal 1 having previously activated relay B, which is now deactivated due to the deactivation of relay A by the operation of relay C, will pass thru armature 9 and break contact 8 of relay A, lead 34, break contact 9 and armature 8 of relay B and armature 4 and make contact 5 of relay C to terminal 2, which is connected to the clutch magnet of the numbering transmitter N. The control signal will start a number tape or other means for transmitting one of a sequential group of numbers. After the numbering transmitter has completed the transmission of a number, the letters combination sensed following the number upon the tape, if a tape is used, opens the automatic stop contacts of the numbering transmitter connected to terminal 3, thereby, removing the ground from terminal 3 and the winding of relay C, releasing relay C.

When relay C releases, the ground connection is restored to the winding of relay A thru break contact 8 and armature 9 of relay C and break contact 8 and armature 9 of relay E, operating relay A. When relay A is operated, as described above, make contact 10 engages armature 9 of relay A connecting a signal appearing at terminal 1 thru resistor R5, resistor R6 and the winding of relay B to ground. Relay B will operate. The operation of relay B will not activate relay C, as was previously the case, due to the fact that the operating circuit for relay C is opened by the activation of relay D which disengages armature 4 of relay D from its break contact 3, thereby disconnecting the winding of relay C from the positive terminal. Relay C cannot operate at this time. When relay B operates, a circuit is closed to operate relay E over a path traced from the positive terminal thru armature 2 and make contact 1 of relay FA, lead 33, armature 2 and make contact 3 of relay B, lead 35, and resistor R11 to the winding of relay E which is connected to ground thru lead 36, armature 9 and break contact 8 of relay C. Relay E will self-hold by a circuit traced from the positive terminal thru resistor R12, make contact 6 and armature 7 of relay E, make contact 6 and armature 7 of relay D and resistor R11. In addition, the opening of break contact 8 and armature 9 of relay E, upon the operation of relay E, releases relay A by disconnecting the ground connection to the winding of the relay. The deactivation of relay A, in turn, releases relay B via the disengagement of make contact 10 and armature 9 of relay A which disconnects terminal 1 from the winding of relay B.

At this point, the control signal on terminal 1 passes thru resistor R5, armature 9 and contact 8 of relay A, lead 34, contact 9 and armature 8 of relay B, armature 4 and contact 3 of relay C, armature 2 and contact 1 of relay E, contact 1 and armature 2 of relay D and armature 7 and contact 6 of relay FA to terminal 4 which is connected to the clutch magnet of message transmitter A, thereby operating transmitter A. When a message has passed completely thru the message transmitter A, the automatic stop contacts of A transmitter, which are connected to terminal 6, will be opened removing ground from the winding of relay FA, releasing relay FA. When relay FA releases, relays D and E which are activated will also be released. The disengagement of contact 1 and armature 2 of relay FA disconnects the positive terminal from the winding of relay D. Contact 6 and armature 7 of relay D will open disconnecting the positive terminal from the winding of relay E. The entire switching sequence is deactivated, and is ready for immediate use upon the grounding of either terminal 6 or 7 which are connected to transmitters A and B, respectively, one of which may now be selected or have already been selected for further operation.

An important aspect of the invention is the fact that the automatic switching circuit will operate to control the selection of a transmitter in response to either a continuous potential control signal or multiplex control pulse. The foregoing description outlines the operation of the circuit when a continuous or steady battery control signal is being received at terminal 1. Such a signal could be supplied from a standard battery or any type of generator capable of delivering a steady continuous potential signal. The circuit will operate to automatically connect terminal 1 to the numbering transmitter and, thereafter, to one of the message transmitters A or B that has been selected for operation. In order to permit the operation of the circuit in connection with multiplex equipment, it is necessary to supply control pulses at terminal 1 which will operate the switching circuit and thus the message or numbering transmitters in synchronism with the multiplex transmitting equipment. The control pulses may be supplied from the multiplex equipment or from a pulse generator, the operation of which is controlled by the multiplex equipment. When an operator connects terminals 6 or 7 to ground by selecting the transmitter he wishes to operate, he has no way of knowing when a synchronizing pulse will appear at terminal 1. If the circuit were allowed to operate merely as a distributing device for the control pulse, the switching functions would be completed at random with respect to the arrival of the first control pulse, thereby connecting the control pulse line, terminal 1, to the transmitter clutch magnet at random. This is objectionable in that an incomplete control pulse could be passed to the clutch of the number transmitter thru terminal 2 or message transmitters thru terminals 4 and 5. The transmitters would be placed in operation out of synchronism with the control pulse utilized in the multiplex operation. The first few characters of the multiplex message transmitted would therefore be mutilated causing considerable delay and difficulty in completing the transmission of a message to a distant location.

To avoid this difficulty, relay B is in one embodiment a slow operate-slow release type whose total operating cycle in conjunction with relays C and D is sufficient to insure the counting of the first complete control pulse or sufficient part thereof and to have completed the switching functions of the relays so that the next complete control pulse can pass to the clutch of the number transmitter N thru terminal 2 or message transmitters A and B thru terminals 4 or 5. If at the time the contacts of relay A complete a circuit to the winding of relay B from terminal 1 a pulse of insufficient remaining duration was being received at terminal 1, relay B, because of its slow operate characteristics, would not become activated. Immediately, however, upon the reception of the next control pulse, relay B will operate. Contact 3 and armature 2 of relay B activating relays C and D, as above described, then allow the next complete pulse to be supplied to the transmitter selected for operation. The use of a slow operate-slow release type of relay for relay B will not effect the operation of the circuit if the circuit should be used in response to a continuous or steady battery control signal appearing at terminal 1 in non-multiplex operation. Relay B would merely operate at the time delay brought about by the slow operating nature thereof. The delayed time of response in no way affects the over-all operation and response of the switching circuit when used with non-multiplex operated telegraph transmitters. However, as pointed out above, when the circuit is used to control the operation of multiplex operated telegraph transmitters, the slow operating and release action of relay B will insure that the switching circuit operating in response to control pulses appearing at terminal 1 will be in synchronism with the multiplex transmitting equipment. Only a control pulse sufficient in size to insure the adequate and synchronous operation of the transmitters will be passed from terminal 1 thru the switching circuit to the clutch of the particular transmitter under control.

During the normal operation of a transmitting station, it is oft times necessary to transmit messages other than the regular type of message communication. For example, it may be necessary to repeat a message or to transmit testing signals for the purpose of checking equipment. During such transmission it is not necessary and, in fact, is objectionable to have the numbering transmitter precede the message with a number. The automatic switching circuit of the invention provides means for disconnecting the numbering transmitter from the circuit so as to avoid such operation of the numbering transmitter.

When the operator desires to forward a message not preceded by a number, he operates a control device connected to terminals 8 and 9 which, for example, may be a normally open push-button switch 22. Upon the closing of the switch 22, momentarily a circuit is closed to complete a path from the positive terminal thru resistor R8, terminals 8 and 9 and resistor R10 to the winding of relay D, the other side of which is connected to ground. Relay D will operate, disengaging contact 3 and armature 4 of relay D. Upon the opening of contact 3 and armature 4 of relay D, relay C cannot be operated and in fact will remain in an inoperative condition regardless of the operation of the remaining relays in the circuit. The opening of the contacts of relay D will disconnect the winding of relay C from the positive terminal of a source of potential. While the push button 22 or other control device connected to terminals 8 and 9 is momentarily closed, one of the transmitters A or B is selected for operation and relay FA or FB is operated by the completion of a ground connection thru terminals 6 or 7. Relays A and B will be operated in the manner described above. Relay C will remain inoperative, relays D and E remaining activated in response to the operation of relays A and B. A control signal which may be a continuous or pulse type signal is connected from terminal 1 to either transmitter A or transmitter B thru terminals 4 or 5, respectively, thus having avoided the use of the auxiliary transmitter N. Upon the completion of the message, relay FA or FB will be deactivated, depending upon the particular transmitter selected for use, returning the switching circuit to its stand-by condition.

In order to eliminate arcing across the contacts of the relays, a surge suppressor is connected directly across the winding of each relay, which may, for example, take the form of a pair of crystal diodes 20 and 21 connected as shown in Figure 1.

The particular values of the resistors included in the circuit will be determined in accordance with the particular type of relays and application in which the circuit is to be used. Figures 3 and 4 disclose relays of the multiple contact telephone type, as shown in Figure 1, which may be utilized in such a circuit arrangement. Relays FA, FB, A, C, D and E are of the U type, the construction of which is shown in Fig. 4. To assist in an understanding of the operation of the circuit shown in Fig. 1, the particular contacts used in the circuit by each of the relays is shown in Fig. 3. Relay B, which is operated in response to a control signal appearing at terminal 1, is of the Y type shown in Fig. 4. An examination of Fig. 3 will show that relay B utilizes transfer contacts, 1, 2 and 3 and normally closed contacts 8 and 9, the remaining contacts of the relay not being used. It is to be emphasized that the particular relays shown are given merely by way of example. The invention is concerned with a sequential operation of the relays and, therefore, the particular type of relays used as to the make-up of the contacts may be determined in accordance with the equipment available and in accordance with the particular application to which the invention is applied.

In a circuit constructed in accordance with the invention, relay B was a 25 milli-second operating-55 milli-second releasing relay at 60 ma. winding current. It was found that such values for the slow operate-slow release relay secured the desired operation. It should be noted however, that relay B does not necessarily have to be a slow operate-slow release type relay, if the relay type chosen for relays A, B, C and E are such that their normal operate times and release times meet both of the following conditions, namely:

(1) The operate time of relay B plus the operate time of relay C plus the release time of relay A plus the release time of relay B when added together shall be equal to or greater than the total possible length of the multiplex control pulse, and (2) The operate time of relay B plus the operate time of relay E plus the release time of relay A plus the release time of relay B when added together shall be equal to or greater than the total possible length of the multiplex control pulse.

Then, the automatic switching circuit described herein will operate as required in synchronism with the multiplex equipment without the necessity of relay B having slow operate-slow release characteristics. The construction of the automatic switching circuit herein described to meet the two conditions stated above, without the use of a slow operate-slow release type for relay B, would in no way affect the operation of the circuit as described herein.

Typical values of the resistors utilized in the circuit given by way of example with a positive potential of 120 volts are as follows:

| | Ohms |
|---|---|
| Resistor 1 | 1000 |
| Resistor 2 | 1000 |
| Resistor 3 | 1750 |
| Resistor 4 | 1200 |
| Resistor 5 | 300 |
| Resistor 6 | 1250 |
| Resistor 7 | 1200 |
| Resistor 8 | 500 |
| Resistor 9 | 500 |
| Resistor 10 | 1200 |
| Resistor 11 | 1200 |
| Resistor 12 | 500 |

Having described my invention, I claim:

1. In combination, a transmitter requiring a control signal for enabling the same to transmit, a relay device set to operate and to release following given time delays, a source of control signals, a first switching means responsive to a condition in said transmitter indicating that said transmitter is ready to transmit to connect said device to said source, said device being set to operate upon the reception by said device of a control signal from said source having a duration corresponding to the operate time delay of said device following the connection of said device to said source, and second switching means responsive to the operation of said device and said first switching means to connect said transmitter to said source to apply a control signal from said source to said transmitter for enabling said transmitter to transmit.

2. In combination, a transmitter requiring a control pulse for enabling the same to transmit, a first relay device set to operate and to release following given time delays, a source of signal energy in the form of a train of control pulses of given duration, a first switching means including at least a second relay device responsive to a condition in said transmitter indicating that said transmitter is ready to transmit to connect said first device to said source, said first device being set to operate in response to the first control pulse applied to said first device from said source having a duration corresponding to the operate time delay of said first device following the connection of said first device to said source, and a second switching means including additional relay devices responsive to the operation of said first device and said first switching means to connect said transmitter to said source to apply a control pulse of said given duration from said source to said transmitter for enabling said transmitter to transmit.

3. A combination as claimed in claim 2 and wherein said first device is set to operate following a time delay less than the duration of said control pulses and to release following a time delay less than the interval between said control pulses.

4. In combination, first and second transmitters each requiring a control signal for enabling the same to transmit, a relay device set to operate and to release following given time delays, a source of control signals, a first switching means responsive to a condition in said first transmitter indicating that said first transmitter is ready to transmit to connect said relay device to said source, said relay device being set to operate upon the reception by said relay device of a control signal from said source having a given duration corresponding to the operate time delay of said relay device following the connection of said relay device to said source, a second switching means responsive to the operation of said relay device and said first switching means to connect said second transmitter to said source to apply a control signal from said source to said second transmitter for enabling said second transmitter to transmit, said first and second switching means being arranged so that the operation of said second switching means to connect said second transmitter to said source causes said first switching means to operate to disconnect said relay device from said source, said relay device upon being disconnected from said source becoming inoperative following the release time delay of said relay device, means included in said second transmitter operative upon the completion of the transmission by said second transmitter to operate said second switching means so as to operate said first switching means to reconnect said relay device to said source, said relay device being reoperated in response to the reception by said relay device of a control signal of said given duration from said source following the reconnection of said relay device to said source, said second switching means being responsive to the reoperation of said relay device and the operation of said first switching means to connect said first transmitter to said source to apply a control signal from said source to said first transmitter to enable said first transmitter to transmit.

5. In combination, first and second transmitters each requiring a control pulse for enabling the same to transmit, a relay device set to operate and to release following given time delays, a source of signal energy in the form of a train of control pulses, a first switching means including at least a second relay device responsive to a condition in said first transmitter indicating that said first transmitter is ready to transmit to connect said first relay device to said source, said first relay device being set to operate upon the reception of a first control pulse from said source having a given duration corresponding to the operate time delay of said first relay device following the connection of said first relay device to said source, a second switching means including additional relay devices responsive to the operation of said first relay device and said first switching means to connect said second transmitter to said source to apply the next complete control pulse following said first control pulse from said source to said second transmitter for enabling said second transmitter to transmit, said first and second switching means being arranged so that the operation of said second switching means to connect said second transmitter to said source causes said first switching means to operate to disconnect said first relay device from said source, said first relay device upon being disconnected from said source becoming inoperative following the release time delay of said first relay device, means included in said second transmitter operative upon the completion of the transmission by said second transmitter to operate said second switching means so as to operate said first switching means to reconnect said first relay device to said source, said first relay device being reoperated in response to the reception by said first relay device of a further control pulse of said given duration from said source following the reconnection of said first relay device to said source, said second switching means being responsive to the reoperation of said first relay device and the operation of said first switching means to connect said first transmitter to said source to apply the next complete control pulse following said further control pulse from said source to said first transmitter for enabling said first transmitter to transmit.

6. An automatic switching circuit for selectively controlling the operation of a pair of message transmitters and an auxiliary transmitter, each of said transmitters requiring a control pulse for enabling the same to transmit, said circuit comprising a source of signal energy in the form of a train of control pulses, a first relay device set to operate following a time delay less than the duration of said control pulses and to release following a time delay not exceeding the interval between said control pulses, a first switching means including at least a second relay device responsive to a condition in either one of said message transmitters indicating that said one message transmitter is ready to transmit to connect said first relay device to said source, said first relay device being set to operate upon the reception of a first control pulse from said source having a given duration corresponding to the operate time delay of said first relay device following the connection of said first relay device to said source, a second switching means including additional relay devices responsive to the operation of said first relay device and said first switching means to connect said auxiliary transmitter to said source to apply the next complete control pulse following said first control pulse from said source to said auxiliary transmitter for enabling said auxiliary transmitter to transmit, said first and second switching means being arranged so that the operation of said second switching means to connect said auxiliary transmitter to said source causes said first switching means to operate to disconnect said first relay device from said source, said first relay device upon being disconnected from said source becoming inoperative following the release time delay of said first relay device, means included in said auxiliary transmitter operative upon the completion of the transmission by said auxiliary transmitter to operate said second switching means so as to operate said first switching means to reconnect said first relay device to said source, said first relay device being reoperated in response to the reception by said first relay device of a further control pulse of said given duration from said source following the reconnection of said first relay device to said source, said second switching means being responsive to the reoperation of said first relay device and the operation of said first switching means to connect said one message transmitter to said source to apply the next complete control pulse following said further control pulse from said source to said one message transmitter for enabling said one message transmitter to transmit.

References Cited in the file of this patent

UNITED STATES PATENTS

| | | |
|---|---|---|
| 2,317,995 | Krum | May 4, 1943 |
| 2,478,409 | Loughlin | Aug. 9, 1949 |
| 2,667,533 | Zenner | Jan. 26, 1954 |

FOREIGN PATENTS

| | | |
|---|---|---|
| 720,863 | Great Britain | Dec. 29, 1954 |
| 153,173 | Australia | Sept. 11, 1953 |